United States Patent [19]
Takahashi et al.

[11] Patent Number: 5,657,313
[45] Date of Patent: Aug. 12, 1997

[54] SIGNAL TRANSMITTING APPARATUS AND SIGNAL RECEIVING APPARATUS USING ORTHOGONAL FREQUENCY DIVISION MULTIPLEXING

[75] Inventors: Nobuaki Takahashi, Yamato; Susumu Takahashi, Tokyo; Kenji Sugiyama, Yokosuka, all of Japan

[73] Assignee: Victor Company of Japan, Ltd., Yokohama, Japan

[21] Appl. No.: 514,127

[22] Filed: Aug. 11, 1995

Related U.S. Application Data

[63] Continuation-in-part of Ser. No. 437,684, May 9, 1995.

[30] Foreign Application Priority Data

| May 9, 1994 | [JP] | Japan | .................................. 6-119637 |
| May 31, 1994 | [JP] | Japan | .................................. 6-141020 |
| Jan. 30, 1995 | [JP] | Japan | .................................. 7-033144 |

[51] Int. Cl.⁶ .................................................. H04L 27/34
[52] U.S. Cl. ........................ 370/491; 375/261; 375/364
[58] Field of Search ................................ 375/200, 261, 375/264, 265, 344, 371, 376, 364; 370/19, 20, 23, 69.1, 100.1, 74, 105.3

[56] References Cited

U.S. PATENT DOCUMENTS

| 5,228,062 | 7/1993 | Bingham ................................. 375/222 |
| 5,345,440 | 9/1994 | Gledhill et al. ........................ 370/19 |
| 5,444,697 | 8/1995 | Leung et al. ............................ 375/362 |

FOREIGN PATENT DOCUMENTS

| 63-37987 | 7/1988 | Japan . |
| 63-37988 | 7/1988 | Japan . |
| 5-83218 | 4/1993 | Japan . |

*Primary Examiner*—Benedict V. Safourek
*Attorney, Agent, or Firm*—Pollock, Vande Sande & Priddy

[57] ABSTRACT

A signal transmitting apparatus using orthogonal frequency division multiplexing includes an inverse fast Fourier transform circuit for converting a digital information signal into a first multi-value QAM modulation signal. A guard interval setting circuit is operative for periodically generating a guard interval signal equal to a time segment of the first multi-value QAM modulation signal, and inserting the guard interval signal into the first multi-value QAM modulation signal to convert the first multi-value QAM modulation signal into a second multi-value QAM modulation signal. A clock signal generating circuit is operative for generating a first clock signal which drives the inverse fast Fourier transform circuit, and generating a second dock signal which drives the guard interval setting circuit. The inverse fast Fourier transform circuit includes a device for generating a pilot signal which corresponds to a given-order carrier, and adding the pilot signal to the first multi-value QAM modulation signal. The pilot signal has a predetermined frequency and an angle modulation component which remains constant over a plurality of symbol periods. The pilot signal corresponding to a given integer times its wavelength or a given odd number times its half wavelength is present in a guard interval occupied by the guard interval signal in the second multi-value QAM modulation signal. The pilot signal is continuously present over the guard interval and another interval.

8 Claims, 8 Drawing Sheets

5,657,313

SIGNAL TRANSMITTING APPARATUS AND SIGNAL RECEIVING APPARATUS USING ORTHOGONAL FREQUENCY DIVISION MULTIPLEXING

CROSS-REFERENCES TO RELATED APPLICATIONS

This is a continuation-in-part of U.S. patent application, Ser. No. 08/437,684, filed on May 9, 1995.

BACKGROUND OF THE INVENTION

This invention relates to a signal transmitting apparatus using orthogonal frequency division multiplexing. This invention also relates to a signal receiving apparatus using orthogonal frequency division multiplexing.

Orthogonal frequency division multiplexing (OFDM) uses multiple carriers which are modulated in accordance with information to be transmitted. The carriers have an orthogonal relationship with each other. Data transmission based on OFDM is executed symbol by symbol. Each OFDM transmission symbol interval is composed of a guard interval and an effective symbol interval. The guard interval is used for reducing multipath effects. The effective symbol interval is used for transmitting data.

In an OFDM receiver side, the reproduction of carriers without time-base variations in phases is generally required to accurately recover transmitted data. Various factors hinder such good reproduction.

SUMMARY OF THE INVENTION

It is a first object of this invention to provide an improved signal transmitting apparatus using orthogonal frequency division multiplexing.

It is a second object of this invention to provide an improved signal receiving apparatus using orthogonal frequency division multiplexing.

A first aspect of this invention provides a signal transmitting apparatus using orthogonal frequency division multiplexing which comprises an inverse fast Fourier transform circuit for converting a digital information signal into a first multi-value QAM modulation signal; a guard interval setting circuit for periodically generating a guard interval signal equal to a time segment of the first multi-value QAM modulation signal, and inserting the guard interval signal into the first multi-value QAM modulation signal to convert the first multi-value QAM modulation signal into a second multi-value QAM modulation signal; and a clock signal generating circuit for generating a first clock signal which drives the inverse fast Fourier transform circuit, and generating a second clock signal which drives the guard interval setting circuit; wherein the inverse fast Fourier transform circuit comprises means for generating a pilot signal which corresponds to a given-order carrier, and adding the pilot signal to the first multi-value QAM modulation signal, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by the guard interval signal in the second multi-value QAM modulation signal, and wherein the pilot signal is continuously present over the guard interval and another interval.

A second aspect of this invention is based on the first aspect thereof, and provides a signal transmitting apparatus wherein the first clock signal and the second clock signal are the same.

A third aspect of this invention is based on the first aspect thereof, and provides a signal transmitting apparatus wherein a ratio between the frequency of the pilot signal and a frequency of the first clock signal is equal to a ratio between predetermined integers.

A fourth aspect of this invention provides a signal transmitting apparatus using orthogonal frequency division multiplexing which comprises an inverse fast Fourier transform circuit for converting a digital information signal into a first multi-value QAM modulation signal; a guard interval setting circuit for periodically generating a guard interval signal equal to a time segment of the first multi-value QAM modulation signal, and inserting the guard interval signal into the first multi-value QAM modulation signal to convert the first multi-value QAM modulation signal into a second multi-value QAM modulation signal; and a clock signal generating circuit for generating a first clock signal which drives the inverse fast Fourier transform circuit, and generating a second clock signal which drives the guard interval setting circuit; wherein the inverse fast Fourier transform circuit comprises means for generating a pilot signal which corresponds to a given-order carrier, and adding the pilot signal to the first multi-value QAM modulation signal, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by the guard interval signal in the second multi-value QAM modulation signal, and wherein time segments of the pilot signal in two adjacent symbol periods have an inverted relation with each other.

A fifth aspect of this invention is based on the fourth aspect thereof, and provides a signal transmitting apparatus wherein the first clock signal and the second clock signal are the same.

A sixth aspect of this invention is based on the fourth aspect thereof, and provides a signal transmitting apparatus wherein a ratio between the frequency of the pilot signal and a frequency of the first clock signal is equal to a ratio between predetermined integers.

A seventh aspect of this invention provides a signal receiving apparatus using orthogonal frequency division multiplexing which comprises first means for reproducing a pilot signal from a multi-value QAM modulation signal by angle demodulation, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by a guard interval signal in the multi-value QAM modulation signal, and wherein the pilot signal is continuously present over the guard interval and another interval; second means for converting a frequency of the reproduced pilot signal to change the reproduced pilot signal into a clock signal; and a fast Fourier transform circuit for converting the multi-value QAM modulation signal into a digital information signal; wherein the fast Fourier transform circuit is driven by the clock signal generated by the second means.

An eighth aspect of this invention provides a signal receiving apparatus using orthogonal frequency division multiplexing which comprises first means for reproducing a pilot signal from a multi-value QAM modulation signal by angle demodulation, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by a guard interval signal in the multi-value QAM modulation signal, and wherein time segments of the pilot signal in two adjacent symbol periods have an inverted relation with each other; second means for converting a frequency of the reproduced pilot signal to change the reproduced pilot signal into a clock signal; and a fast Fourier transform circuit for converting the multi-value QAM modulation signal into a digital information signal; wherein the fast Fourier transform circuit is driven by the clock signal generated by the second means.

DESCRIPTION OF THE PREFERRED EMBODIMENTS

Before a detailed description of this invention, prior-art apparatuses will be described for a better understanding of this invention.

Figure 1:
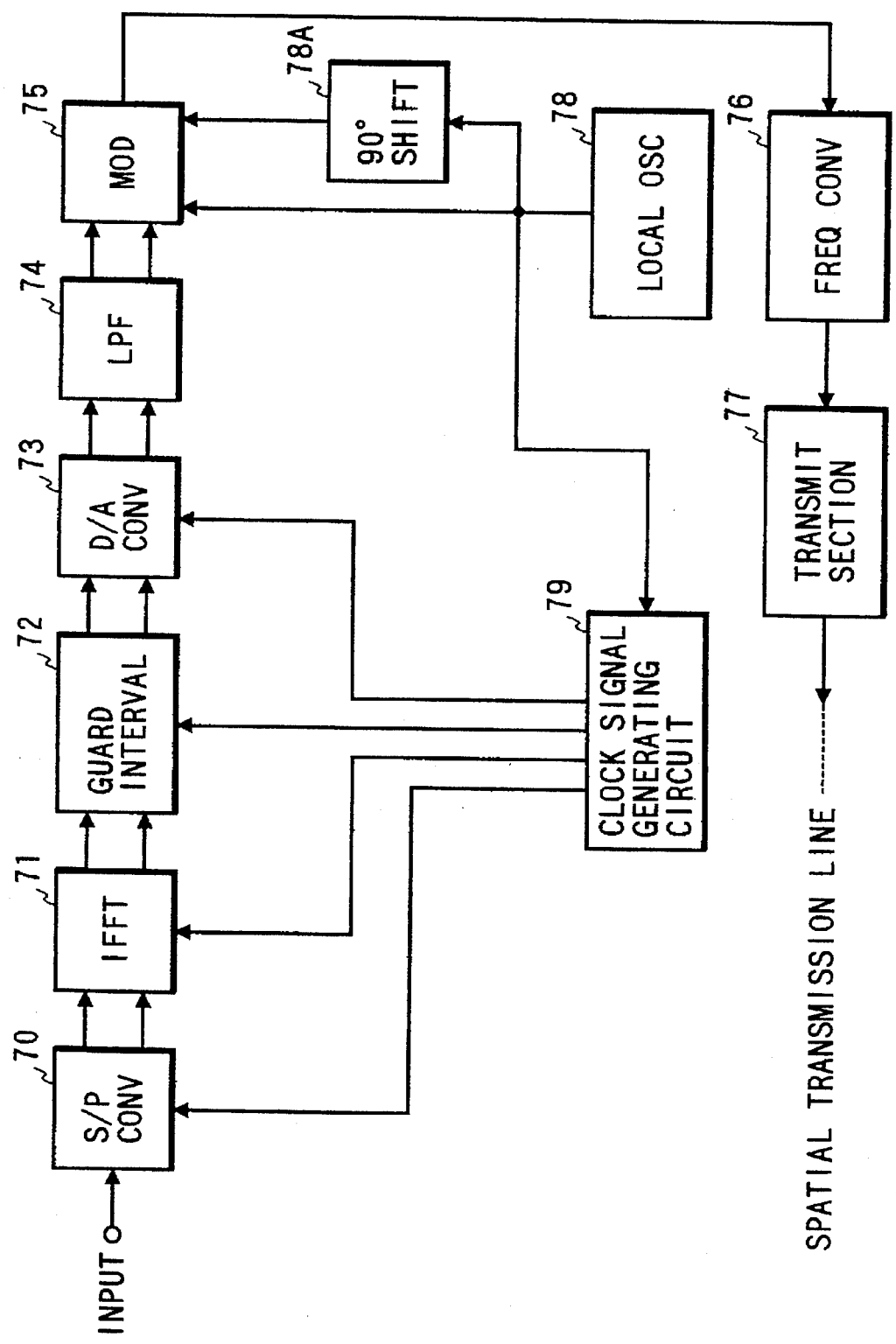
FIG. 1 is a block diagram of a prior-art OFDM signal transmitter.

FIG. 1 shows a prior-art OFDM signal transmitter. With reference to FIG. 1, a digital information signal is fed via an input terminal to a serial-to-parallel (S/P) conversion circuit 70. An error correction code may be added to the digital information signal.

Output signals from the S/P conversion circuit 70 are fed to an IFFT (inverse fast Fourier transform) circuit 71. Output signals from the IFFT circuit 71 are fed via a guard interval circuit 72 to a D/A converter 73. The output signals of the IFFT circuit 71 are processed by the guard interval circuit 72 for reducing multipath effects. Output signals of the guard interval circuit 72 are changed by the D/A converter 73 into corresponding analog signals.

Only components of the analog signals in a desired frequency band are passed through an LPF (a low pass filter) 74. Output analog signals from the LPF 74 which correspond to a real part and an imaginary part (an I signal and a Q signal) are fed to a quadrature modulator 75 as baseband signals, being converted into an IF OFDM (intermediate frequency OFDM) signal. The IF OFDM signal has multiple IF orthogonal carriers which are modulated as indications of the output baseband signals of the LPF 74.

The IF OFDM signal is changed by a frequency converter 76 into an RF OFDM (radio frequency OFDM) signal in a desired frequency band for transmission. The RF OFDM signal has multiple RF orthogonal carriers which are modulated as indications of the output baseband signals of the LPF 74. The RF OFDM signal is fed from the frequency converter 76 to a transmitting section 77. The RF OFDM signal is transmitted via a linear amplifier and a transmission antenna composing the transmitting section 77.

An output signal of a local oscillator 78 which has a given frequency is fed to the quadrature modulator 75 and a 90° phase shifting circuit 78A. An output signal of the 90° phase shifting circuit 78A is fed to the quadrature modulator 75. In this way, a pair of local oscillator signals having a quadrature relation are fed to the quadrature modulator 75. The output signal of the local oscillator 78 is also fed to a clock signal generating circuit 79. The circuit 79 generates clock signals in response to the output signal of the local oscillator 78, and outputs the generated clock signals to the S/P conversion circuit 70, the IFFT circuit 71, the guard interval circuit 72, and the D/A converter 73 as operation timing control signals respectively.

Figure 2:
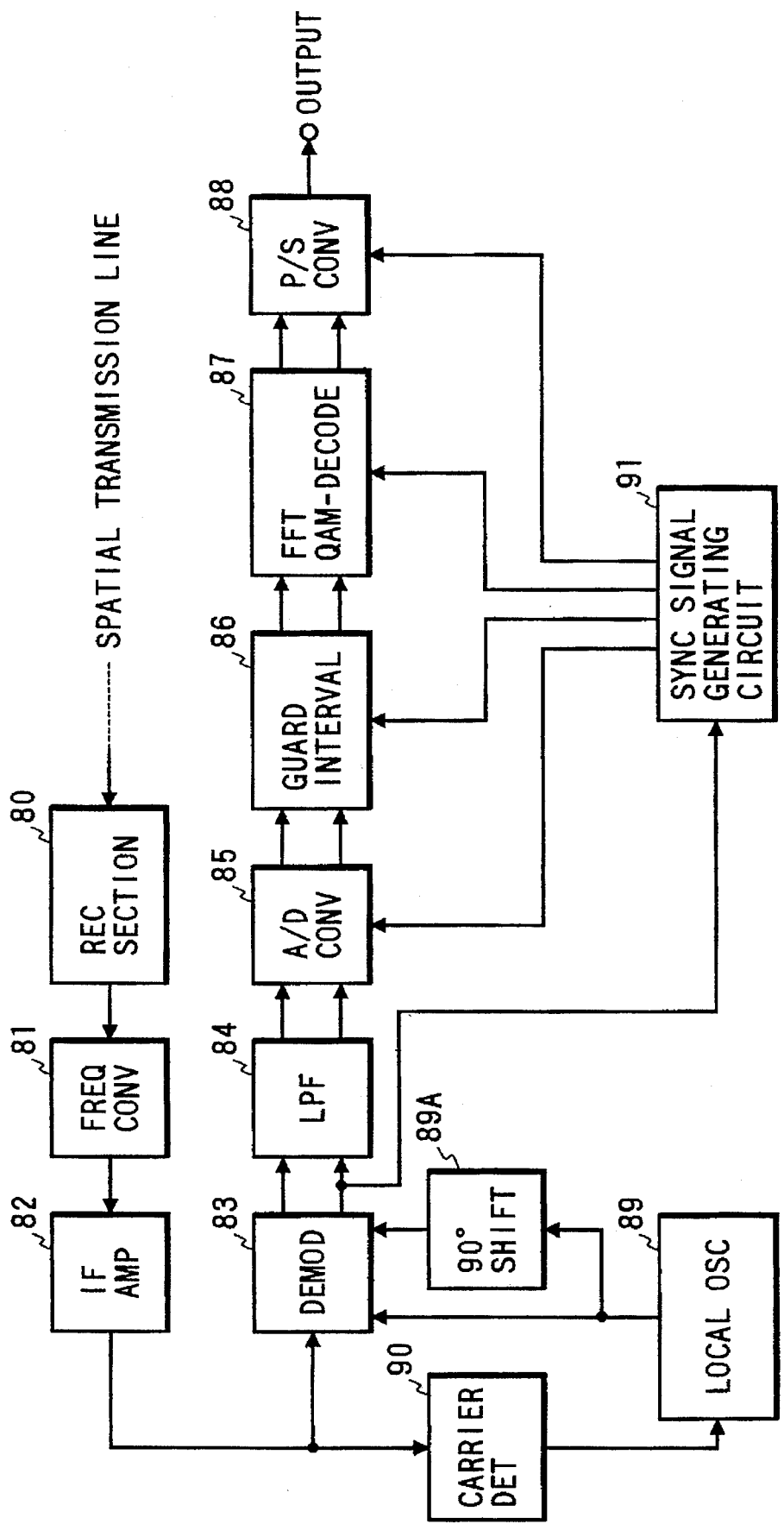
FIG. 2 is a block diagram of a prior-art OFDM signal receiver.

FIG. 2 shows a prior-art OFDM signal receiver. With reference to FIG. 2, a receiving section 80 includes a reception antenna which catches an RF OFDM signal transmitted from the OFDM signal transmitter of FIG. 1. The RF OFDM signal has multiple RF orthogonal carriers which are modulated in accordance with transmitted baseband signals respectively. The receiving section 80 includes an RF amplifier which enlarges the caught RF OFDM signal. An output RF OFDM signal from the RF amplifier in the receiving section 80 is fed to a frequency converter 81, being converted into a corresponding IF OFDM signal thereby. The IF OFDM signal has multiple IF orthogonal carriers which are modulated in accordance with transmitted baseband signals respectively. The IF OFDM signal is fed from the frequency converter 81 to a quadrature demodulator 83 and a carrier detecting circuit 90 via an IF amplifying circuit 82.

A local oscillator 89 reproduces a local oscillator signal in response to an output signal of the carrier detecting circuit 90. The local oscillator signal is fed to the quadrature demodulator 83 and a 90° phase shifting circuit 89A. An output signal of the 90° phase shifting circuit 89A is fed to the quadrature demodulator 83. In this way, a pair of reproduced local oscillator signals having a quadrature relation are fed to the quadrature demodulator 83. The IF OFDM signal is demodulated by the quadrature demodulator 83 into baseband signals corresponding to a real part and an imaginary part (an I signal and a Q signal).

Output signals from the quadrature demodulator 83 are fed via an LPF 84 to an A/D converter 85, being changed into corresponding digital signals thereby. One of the output signals from the quadrature demodulator 83 is fed to a sync signal generating circuit 91. The circuit 91 reproduces and generates sync signals or clock signals in response to the output signal of the quadrature demodulator 83.

Output signals from the A/D converter 85 are fed via a guard interval circuit 86 to an FFT QAM (fast Fourier transform, quadrature amplitude modulation) decoding circuit 87. The circuit 87 subjects output signals of the guard interval circuit 86 to processing which corresponds to complex Fourier transform. According to the complex Fourier transform processing, the circuit 87 derives the levels of baseband carriers in the real-part signal and the imaginary-part signal outputted from the guard interval circuit 86. Thus, the transmitted digital information is recovered.

Output signals of the FFT QAM decoding circuit 87 are fed to a parallel-to-serial (P/S) conversion circuit 88. An output signal of the P/S conversion circuit 88 is fed to an external device (not shown) as an output signal of the prior-art OFDM signal receiver.

The sync signals and the clock signals are fed from the sync signal generating circuit 91 to the A/D converter 85, the guard interval circuit 86, the FFT QAM decoding circuit 87, and the P/S conversion circuit 88 as operation timing control signals respectively.

In the prior-art OFDM signal transmitter of FIG. 1 and the prior-art OFDM signal receiver of FIG. 2, transmitted data can be accurately recovered by the receiver when the frequencies of the carriers in the receiver are exactly equal to the frequencies of the carriers in the transmitter. A difference in frequency between the output signal of a local oscillator in the frequency converter 76 in the transmitter and the output signal of a local oscillator in the frequency converter 81 in the receiver causes a disagreement between the carriers in the transmitter and the carriers in the receiver. In addition, a difference in frequency between the output signal of the local oscillator 78 in the transmitter and the output signal of the local oscillator 89 in the receiver causes a disagreement between the carriers In the transmitter and the carriers in the receiver. Such a disagreement results in an increased symbol error rate related to data recovered by the receiver.

In the prior-art OFDM signal transmitter of FIG. 1 and the prior-art OFDM signal receiver of FIG. 2, transmitted data can be accurately recovered by the receiver when the clock signal fed to the IFFT circuit 71 in the transmitter accurately corresponds to the clock signal fed to the FFT QAM decoding circuit 87 in the receiver. A disagreement between the clock signal fed to the IFFT circuit 71 and the clock signal fed to the FFT QAM decoding circuit 87 results in an increased symbol error rate related to data recovered by the receiver.

FIRST EMBODIMENT

Figure 3:
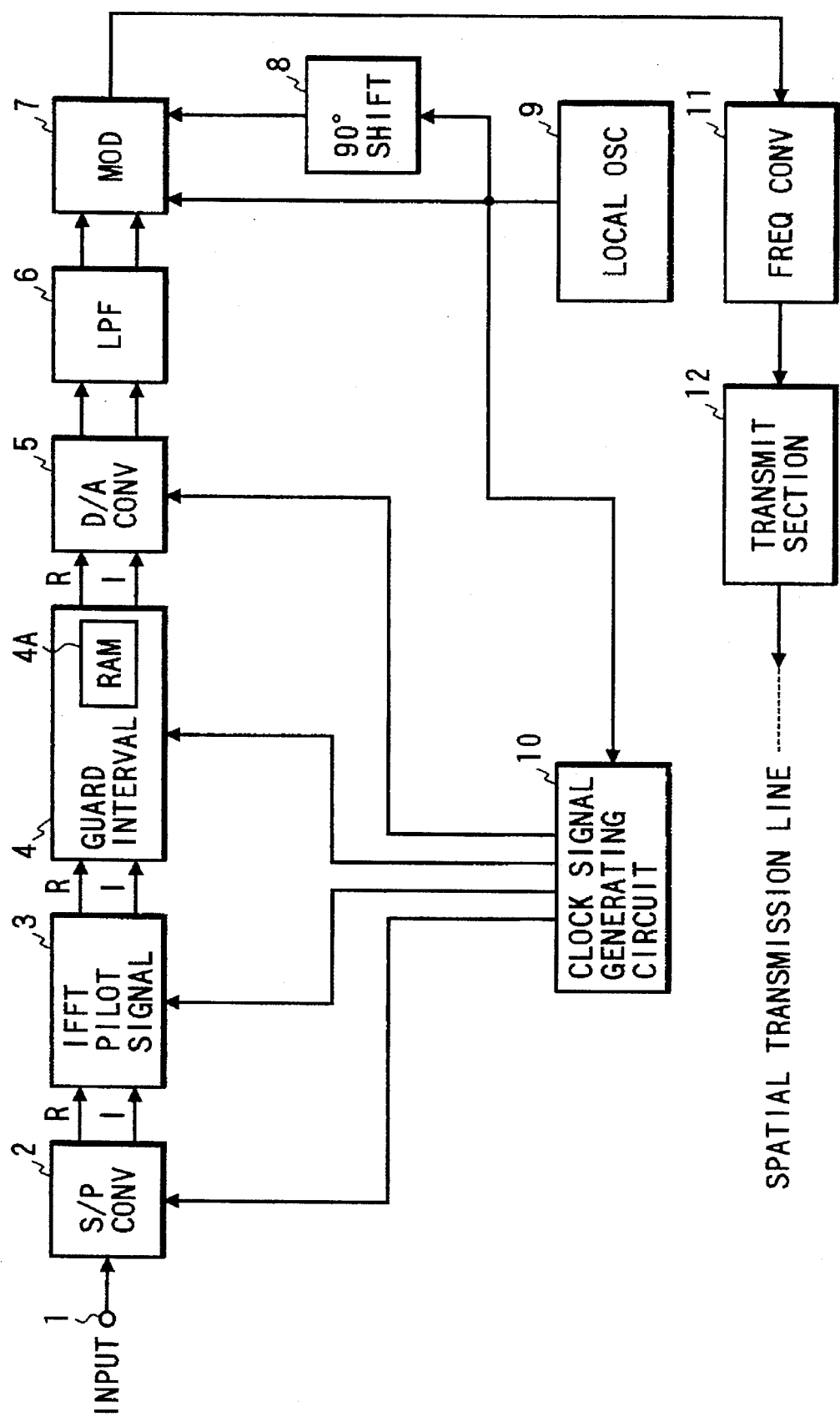
FIG. 3 is a block diagram of a signal transmitting apparatus using orthogonal frequency division multiplexing (OFDM) according to a first embodiment of this invention.

FIG. 3 shows a signal transmitting apparatus using orthogonal frequency division multiplexing (OFDM) according to a first embodiment of this invention. Digital data transmitted by the signal transmitting apparatus of FIG. 3 agrees with, for example, a compressed audio signal and a compressed video signal.

OFDM uses multiple carriers having an orthogonal relationship with each other. In OFDM data transmission, independent digital information pieces are transmitted by using multiple carriers respectively. Since the carriers are orthogonal with each other, the levels of the spectrums of carriers neighboring a given carrier are nullified at a point corresponding to the frequency of the given carrier.

An IFFT (inverse fast Fourier transform) circuit is used to enable the generation of a set of multiple orthogonal carriers. A baseband OFDM signal can be generated by executing inverse discrete Fourier transform (inverse DFT) using N complex numbers during a time interval T. Points of the inverse DFT correspond to modulation signal outputs respectively.

Basic specifications of the signal transmitting apparatus of FIG. 3 are as follows. The central carrier frequency in an RF band is equal to 100 MHz. The number of carriers for data transmission is equal to 248. The modulation is of the 256-QAM OFDM type. The number of used carriers is equal to 257. The transmission band width is equal to 100 kHz. The used band width is equal to 99 kHz. The transmission data rate is equal to 750 kbps. The guard interval is equal to 60.6 μsec.

With reference to FIG. 3, a digital information signal in the form of a bit stream is fed via an input terminal 1 to a serial-to-parallel (S/P) conversion circuit 2. The digital information signal results from, for example, compressing an audio information signal or a video information signal according to an MPEG encoding process. An error correction code may be added to the digital information signal.

The digital information signal, that is, the digital input signal, is divided by the S/P conversion circuit 2 into blocks corresponding to modulating signals for 256 QAM. The S/P conversion circuit 2 outputs the modulating signals. According to 256 QAM, 16 different levels are defined in an amplitude direction while 16 different levels are defined in an angle direction. In addition, 256 different digital states are assigned to the 256 levels (16 levels multiplied by 16 levels) respectively.

As previously described, 248 carriers among 257 carriers are used for transmitting data information. The 9 remaining carriers are used for transmitting calibration signals and other helper signals (other auxiliary signals).

The S/P conversion circuit 2 outputs 248-byte digital data for every 1-symbol interval. In more detail, the S/P conversion circuit 2 outputs a first set of 248 parallel digital signals each having 4 bits, and a second set of 248 parallel digital signals each having 4 bits for every 1-symbol interval. The first set and the second set correspond to a real part and an imaginary part (an I signal and a Q signal) respectively.

The 248 output signals from the S/P conversion circuit 2 in each of the real part and the imaginary part are fed to a combination 3 of an IFFT (inverse fast Fourier transform) circuit and a pilot signal generating circuit. The IFFT and pilot signal generating circuit 3 operates in response to a clock signal fed from a clock signal generating circuit 10. Regarding each of the real part and the imaginary part, the operation of the IFFT and pilot signal generating circuit 3 corresponds to subjecting 248 carriers to 256 QAM responsive to the 248 output signals from the S/P conversion circuit 2 respectively. The IFFT and pilot signal generating circuit 3 generates the 248 modulation-resultant signals in each of the real part and the imaginary part. The IFFT and pilot signal generating circuit 3 combines the 248 modulation-resultant signals of the real part into a multiplexing-resultant signal corresponding to the real part. Also, the IFFT and pilot signal generating circuit 3 combines the 248 modulation-resultant signals of the imaginary part into a multiplexing-resultant signal corresponding to the imaginary part.

In the IFFT and pilot signal generating circuit 3, discrete frequency points corresponding to the respective carriers are generated in response to the clock signal fed from the clock signal generating circuit 10. Discrete frequency point information is transmitted as Nyquist frequency information representing a value equal to a half of a period N. Since the Nyquist frequency information agrees with a half of the discrete frequency point information in period, a sample position signal for operating an FFT (fast Fourier transform) circuit can be generated in a receiver side by reproducing the Nyquist frequency information and executing a frequency multiplying process (a frequency doubling process).

The Nyquist frequency information is generated or added by applying a given-level signal to an N/2 real-part input terminal R (and/or an N/2 imaginary-part input terminal I) of the IFFT and pilot signal generating circuit 3. For example, the given-level signal is produced by a suitable signal generator provided in the IFFT and pilot signal generating circuit 3.

Figure 4:
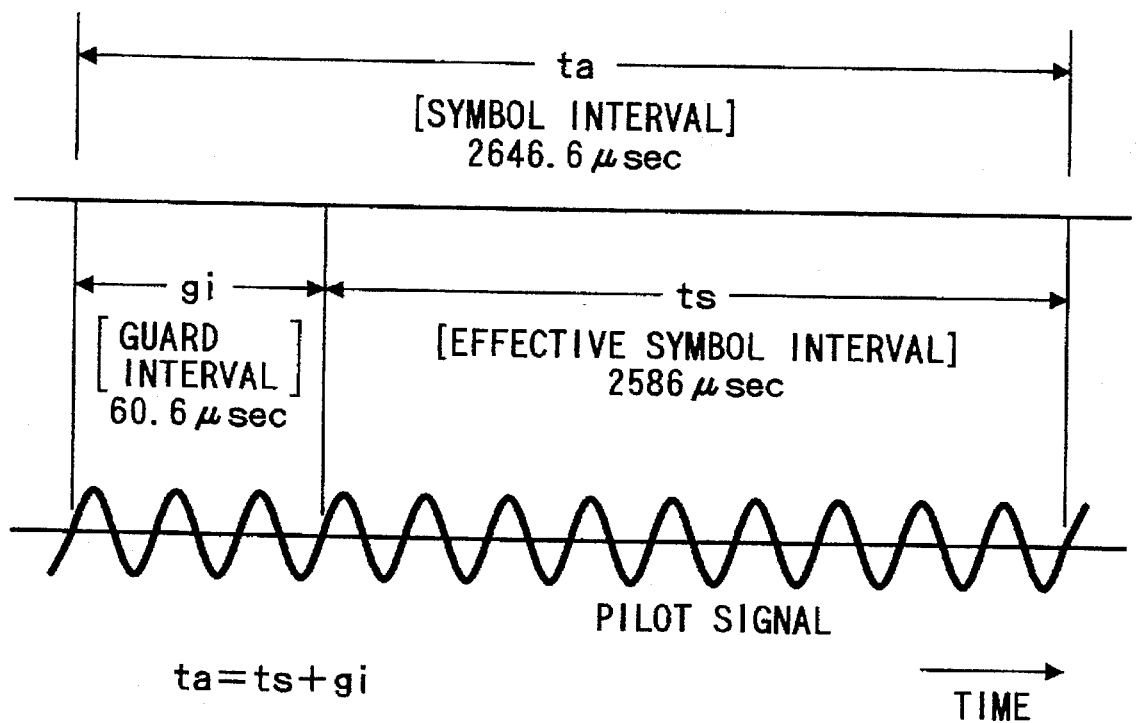
FIG. 4 is a time-domain diagram of a symbol interval, a guard interval, an effective symbol interval, and a pilot signal.

The output signals of the IFFT and pilot signal generating circuit 3 are fed to a guard interval setting circuit 4 including a RAM (random access memory) 4A. As shown in FIG. 4, the guard interval setting circuit 4 provides a guard interval "gi" of a given length for every symbol of the output signals of the IFFT and pilot signal generating circuit 3. Specifically, each guard interval "gi" has a temporal length of 60.6 μsec. In addition, each transmission symbol interval "ta" is composed of a guard interval "gi", and an effective symbol interval "ts" following the guard interval "gi". Each transmission symbol interval "ta" corresponds to 2646.6 μsec while each effective symbol interval "ts" corresponds to 2586 μsec. The guard intervals are designed to reduce multipath distortions caused by a transmission line.

The guard interval setting circuit 4 operates in response to a clock signal fed from the clock signal generating circuit 10. In the guard interval setting circuit 4, final portions of the output signals of the IFFT and pilot signal generating circuit 3 in every window interval (every symbol interval) are copied, and the copy-resultant signal portions are moved to temporal positions immediately preceding window interval signals (effective symbol interval signals).

To implement the above-indicated process, the guard interval setting circuit 4 functions as follows. Specifically, the output signals of the IFFT and pilot signal generating circuit 3 are stored, sequentially sample by sample, into the RAM 4A for every window interval (every symbol interval). Then, finally-stored portions of the output signals of the IFFT and pilot signal generating circuit 3 are read out from the RAM 4A so that signals occupying a guard interval "gi" are generated. Subsequently, the output signals of the IFFT and pilot signal generating circuit 3 are read out from the RAM 4A in a sequence starting from the firstly-stored portions thereof so that signals occupying an effective symbol interval "ts" are generated.

The previously-indicated Nyquist frequency information can be transmitted by using not only an effective symbol interval but also a guard interval. Regarding the Nyquist frequency information, to maintain the continuity with preceding and following IFFT window interval signals, it is preferable that the pilot signal corresponding to one wavelength multiplied by a given integer is present in a guard interval. In this case, the pilot signal in a symbol interval is continuously present over a guard interval and an effective symbol interval. Thus, an actually-transmitted pilot signal, that is, the pilot signal up-converted into a transmission RF range, has a monochromatic frequency spectrum (a single-line frequency spectrum).

In this embodiment, the pilot signal has the Nyquist frequency. It should be noted that the frequency of the pilot signal may differ from the Nyquist frequency as long as there is a relation in frequency between the pilot signal and the sample position signal which is denoted by a simple ratio between integers. The pilot signal may use transmitted highest-frequency information.

In the case of IFFT having a period M, a pilot signal is located at a frequency position equal to a half of a Nyquist frequency corresponding to each of a period M/4 and a period 3M/4. In addition, carriers transmitted bit OFDM use those corresponding to first to M/4-th output signals from the IFFT, and those corresponding to 3M/4-th to M-th output signals from the IFFT. Thus, it is possible to generate signals equivalent to those generated in the case of M=2N.

Accordingly, a continuous pilot signal can be transmitted by using an effective symbol interval as well as a guard interval. The sample position signal can be generated by recovering the pilot signal and multiplying the frequency of the recovered pilot signal by 4.

In the case where window interval signal information of FFT can be recovered separately, FFT calculations for an OFDM signal can be implemented by combining the window interval signal information and the sample position signal. Thus, in this case, the OFDM signal can be decoded.

A description will now be given of a symbol interval "ta" related to the guard interval setting circuit 4. In the case where the used frequency band is equal to 99 kHz and the period N is given as N=256, an effective symbol frequency "fs" and an effective symbol period "ts" are expressed as follows.

$$fs=99,000/256=387 \text{ Hz}$$

$$ts=1/fs=2,586 \text{ μsec}$$

When the guard interval "gi" for removing multipath effects is set to six times the sample period (six times the reciprocal of the used frequency band), the guard interval "gi" is given as follows.

$$gi=(1/99,000)\times 6=60.6 \text{ μsec}$$

In this case, the symbol interval "ta" and the symbol frequency "fa" are given as follows.

$$ta=ts+gi=2586+60.6=2646.6 \text{ μsec}$$

$$fa=1/ta=378 \text{ Hz}$$

Output signals of the guard interval setting circuit 4 are fed to a D/A converter 5, being converted into corresponding analog signals thereby. The D/A converter 5 outputs the resultant analog signals to an LPF (a low pass filter) 6. Only components of the output signals of the D/A converter 5 in a desired frequency band are passed through the LPF 6.

Output signals of the LPF 6 which correspond to the real part and the imaginary part are fed to a quadrature modulator 7 as baseband signals. A local oscillator 9 outputs a given-frequency signal, for example, a 10.7-MHz signal, to the quadrature modulator 7. The frequency of the output signal of the local oscillator 9 corresponds to a given intermediate frequency (IF). The local oscillator 9 also outputs the given-frequency signal to a 90° phase shifting circuit 8. The circuit 8 shifts the phase of the given-frequency signal by 90°, and outputs the phase-shift resultant signal to the quadrature modulator 7. In this way, a pair of given-frequency signals having a quadrature relation are fed to the quadrature modulator 7. In the quadrature modulator 7, the quadrature given-frequency signals are modulated in accordance with the baseband signals outputted from the LPF 6 so that the baseband signals are converted into an IF OFDM (intermediate frequency OFDM) signal. The IF OFDM signal has multiple IF orthogonal carriers which are modulated as indications of the output baseband signals of the LPF 6.

The IF OFDM signal is changed by a frequency converter 11 into an RF OFDM (radio frequency OFDM) signal in a desired frequency band for transmission. The RF OFDM signal has multiple RF orthogonal carriers which are modulated as indications of the output baseband signals of the LPF 6 respectively. The frequency converter 11 includes a local oscillator and a mixer. In the frequency converter 11, the IF OFDM signal and the output signal of the local oscillator are mixed by the mixer so that the IF OFDM signal is converted into the RF OFDM signal.

The RF OFDM signal is fed to a transmitting section 12 from the frequency converter 11. The transmitting section 12 includes a linear power amplifier and a transmission antenna. The RF OFDM signal is fed via the linear power amplifier to the transmission antenna, being radiated by the transmission antenna into a transmission line (the air).

The output signal of the local oscillator 9 is also fed to the clock signal generating circuit 10. The circuit 10 generates clock signals in response to the output signal of the local oscillator 9 by frequency dividing processes, and outputs the generated clock signals to the S/P conversion circuit 2, the IFFT and pilot signal generating circuit 3, the guard interval setting circuit 4, and the D/A converter 5 as operation timing control signals respectively.

In this embodiment, during every 1-symbol period, 248 parallel digital data pieces each having 8 bits (4 bits plus 4 bits) are transmitted together with 248 carriers. Accordingly, the transmission data rate corresponds to 248 bytes per symbol interval. Thus, the transmission data rate per second is approximately equal to 750 kilo-bits.

SECOND EMBODIMENT

Figure 5:
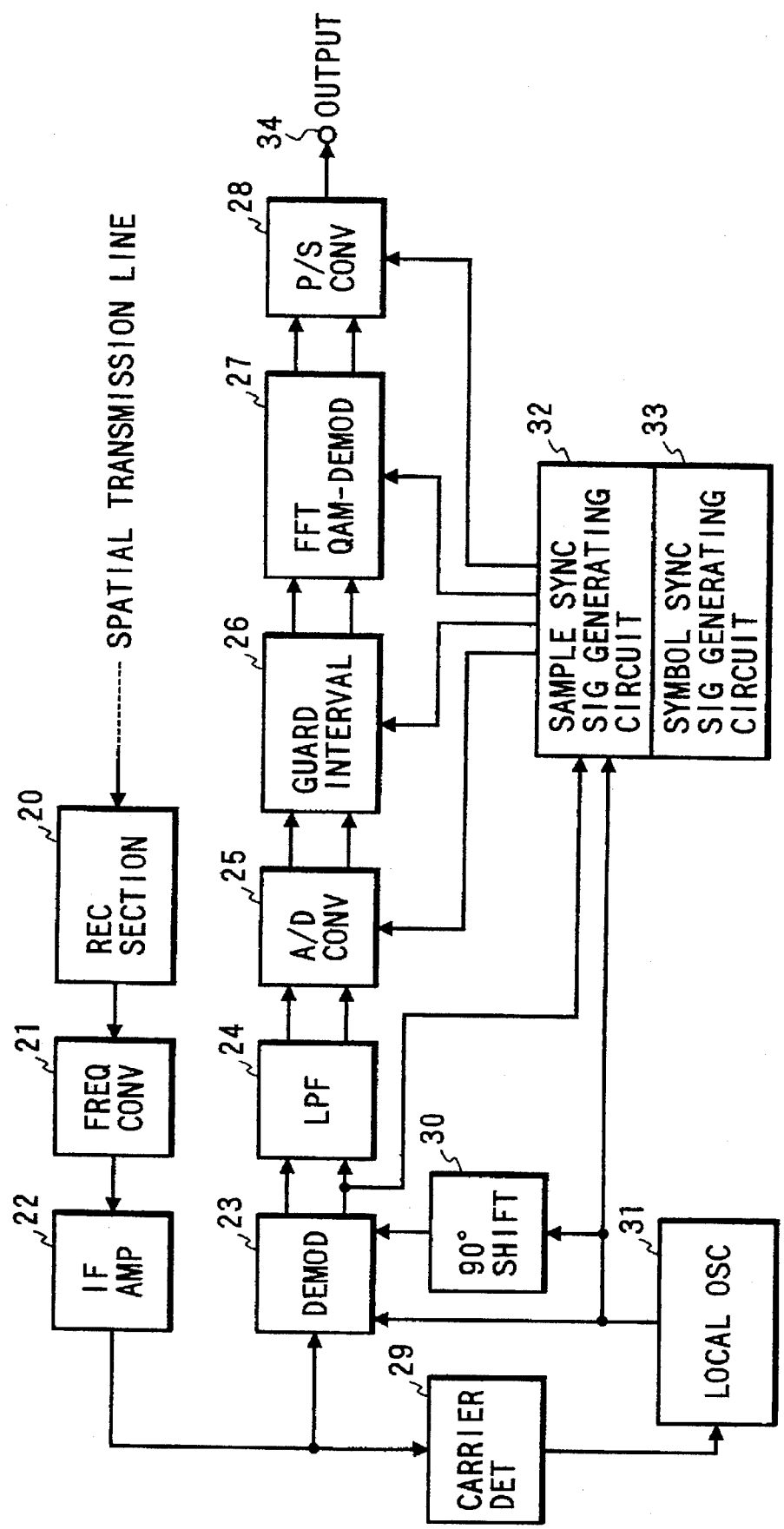
FIG. 5 is a block diagram of a signal receiving apparatus using orthogonal frequency division multiplexing (OFDM) according to a second embodiment of this invention.

FIG. 5 shows a signal receiving apparatus using orthogonal frequency division multiplexing (OFDM) according to a second embodiment of this invention. The signal receiving apparatus of FIG. 5 is able to accept an RF OFDM signal transmitted by the signal transmitting apparatus of FIG. 3.

With reference to FIG. 5, a receiving section 20 includes a reception antenna which catches an RF OFDM signal transmitted from, for example, the signal transmitting apparatus of FIG. 3. The RF OFDM signal has multiple RF orthogonal carriers which are modulated in accordance with transmitted baseband signals respectively. The receiving section 20 includes an RF amplifier which enlarges the caught RF OFDM signal.

An output RF OFDM signal from the RF amplifier in the receiving section 20 is fed to a frequency converter 21, being converted into a corresponding IF OFDM signal thereby. The IF OFDM signal has multiple IF orthogonal carriers which are modulated in accordance with transmitted baseband signals respectively. The frequency converter 21 includes a local oscillator and a mixer. In the frequency converter 21, the RF OFDM signal and the output signal of the local oscillator are mixed by the mixer so that the RF OFDM signal is converted into the IF OFDM signal.

The IF OFDM signal is fed from the frequency converter 21 to an IF amplifying circuit 22, being enlarged to a desired level thereby. The output IF OFDM signal from the IF amplifying circuit 22 is fed to a quadrature demodulator 23 and a carrier detecting circuit 29.

The carrier detecting circuit 29 includes a PLL (phase locked loop) circuit having a combination of a phase comparator (a multiplier), an LPF, a VCO (a voltage-controlled oscillator), and a ¼ frequency divider. The PLL circuit recovers the carriers in the IF OFDM signal. An output signal of the carrier detecting circuit 29, which corresponds to the recovered carriers, is fed to a local oscillator 31. The local oscillator 31 is designed to extract the central carrier among the carriers in the IF OFDM signal with a negligible phase error. The local oscillator 31 outputs a signal corresponding to the extracted central carrier. Thus, the local oscillator 31 reproduces a local oscillator signal used in a transmitter side.

In this embodiment, the IF OFDM signal (or the RF OFDM signal) is based on the information-transmitting carriers with frequencies which are spaced at intervals of 378 Hz equal to the symbol frequency. The frequencies of the information carriers neighboring the central carrier are spaced from the frequency of the central carrier by only 378 Hz. Accordingly, it is preferable that the extraction of the central carrier is executed by a high-selectivity circuit.

The local oscillator 31 uses a high-selectivity circuit. Specifically, the local oscillator 31 includes a PLL circuit for extracting the central carrier from the carriers outputted by the carrier detecting circuit 29. A voltage-controlled oscillator (VCO) in the PLL circuit in the local oscillator 31 uses a voltage-controlled crystal oscillator (VCXO) which can oscillate at a frequency variable in a given small range (for example, ±200 Hz) around the frequency of the central carrier. In addition, an LPF in the PLL circuit has a cut-off frequency adequately low with respect to 378 Hz.

The output signal of the local oscillator 31 is fed to the quadrature demodulator 23. The output signal of the local oscillator 31 is also fed to a 90° phase shifting circuit 30. The circuit 30 shifts the phase of the output signal of the local oscillator 31 by 90°. The phase-shift resultant signal is outputted from the circuit 30 to the quadrature demodulator 23. In this way, a pair of reproduced local oscillator signals having a quadrature relation are fed to the quadrature demodulator 23. In response to the quadrature signals, the IF OFDM signal is demodulated by the quadrature demodulator 23 into baseband signals corresponding to a real part and an imaginary part (an I signal and a Q signal) respectively.

Output signals from the quadrature demodulator 23 are fed to an LPF 24. Only components of the output signals of the quadrature demodulator 23, which occupy a desired frequency band, are passed through the LPF 24. Output signals of the LPF 24 which have analog forms are fed to an A/D converter 25. The output signals of the LPF 24 are subjected to sampling processes and are converted by the A/D converter 25 into corresponding digital signals.

One of the output signals of the quadrature demodulator 23 is fed to a sample sync signal generating circuit 32. The output signal of the local oscillator 31 is fed to the sample sync signal generating circuit 32. The sample sync signal generating circuit 32 includes a PLL circuit phase-locked with respect to a pilot signal in the output signal of the quadrature demodulator 23. It should be noted that the pilot signal is transmitted as a continuous signal during every symbol interval containing a guard interval. The sample sync signal generating circuit 32 derives pilot signal frequency information, and reproduces the pilot signal.

In a transmitter side, the frequency of the pilot signal is set to correspond to a given ratio between integers with respect to the frequency of the sample clock signal. The sample sync signal generating circuit 32 includes a frequency multiplier operating on the reproduced pilot signal at a multiplying factor corresponding to the above-indicated frequency ratio. A sample clock signal (a clock sync signal) is recovered through the frequency multiplication.

The output signals of the A/D converter 25 are fed to a guard interval processing circuit 26. The guard interval processing circuit 26 extracts time-portions of the output signals of the A/D converter 25 which occupy every effective symbol interval. Output signals of the guard interval processing circuit 26 are fed to an FFT QAM (fast Fourier transform, quadrature amplitude modulation) decoding circuit 27.

A symbol sync signal generating circuit 33 connected to the sample sync signal generating circuit 32 detects a symbol interval in response to the sample clock signal, and generates a symbol sync signal related to the detected symbol interval.

The FFT QAM decoding circuit 27 receives the clock sync signal and the symbol sync signal from the sample sync signal generating circuit 32 and the symbol sync signal generating circuit 33. In response to the clock sync signal and the sample sync signal, the circuit 27 subjects the output signals of the guard interval processing circuit 26 to processing which corresponds to complex Fourier transform. According to the complex Fourier transform processing, the circuit 27 derives the levels of baseband carriers in the real-part signal and the imaginary-part signal outputted from the guard interval processing circuit 26. In the FFT QAM decoding circuit 27, the derived real-part levels and the derived imaginary-part levels are compared with reference demodulation output levels so that the states of transmitted digital signals are determined. In this way, the transmitted digital information is recovered.

Output signals of the FFT QAM decoding circuit 27 which correspond to the recovered digital signals are fed to a parallel-to-serial (P/S) conversion circuit 28. The output signals of the FFT QAM decoding circuit 27 are rearranged and combined by the P/S conversion circuit 28 into a serial-form digital signal. The serial-form digital signal is transmitted from the P/S conversion circuit 28 to an external device (not shown) via an output terminal 34.

The sample sync signal generating circuit 32 and the symbol sync signal generating circuit 33 produce sync signals and clock signals in response to the output signal of the quadrature demodulator 23 and the output signal of the local oscillator 31, and feed the produced sync signals and the produced clock signals to the A/D converter 25, the guard interval processing circuit 26, the FFT QAM decoding circuit 27, and the P/S conversion circuit 28 as operation timing control signals.

The pilot signal in the output signal of the quadrature demodulator 23 is continuous, and is free from jitter components. Therefore, the pilot signal is recovered without jitter, and the sample clock signal is accurately reproduced in response to the recovered pilot signal. The clock signal fed to the FFT QAM decoding circuit 27 in the receiver side accurately corresponds to the clock signal fed to the the IFFT and pilot signal generating circuit 3 in the transmitter side. Thus, the FFT process in the receiver side can be exactly inverse with the IFFT process in the transmitter side so that the transmitted data can be accurately recovered in the receiver side.

THIRD EMBODIMENT

Figure 6:
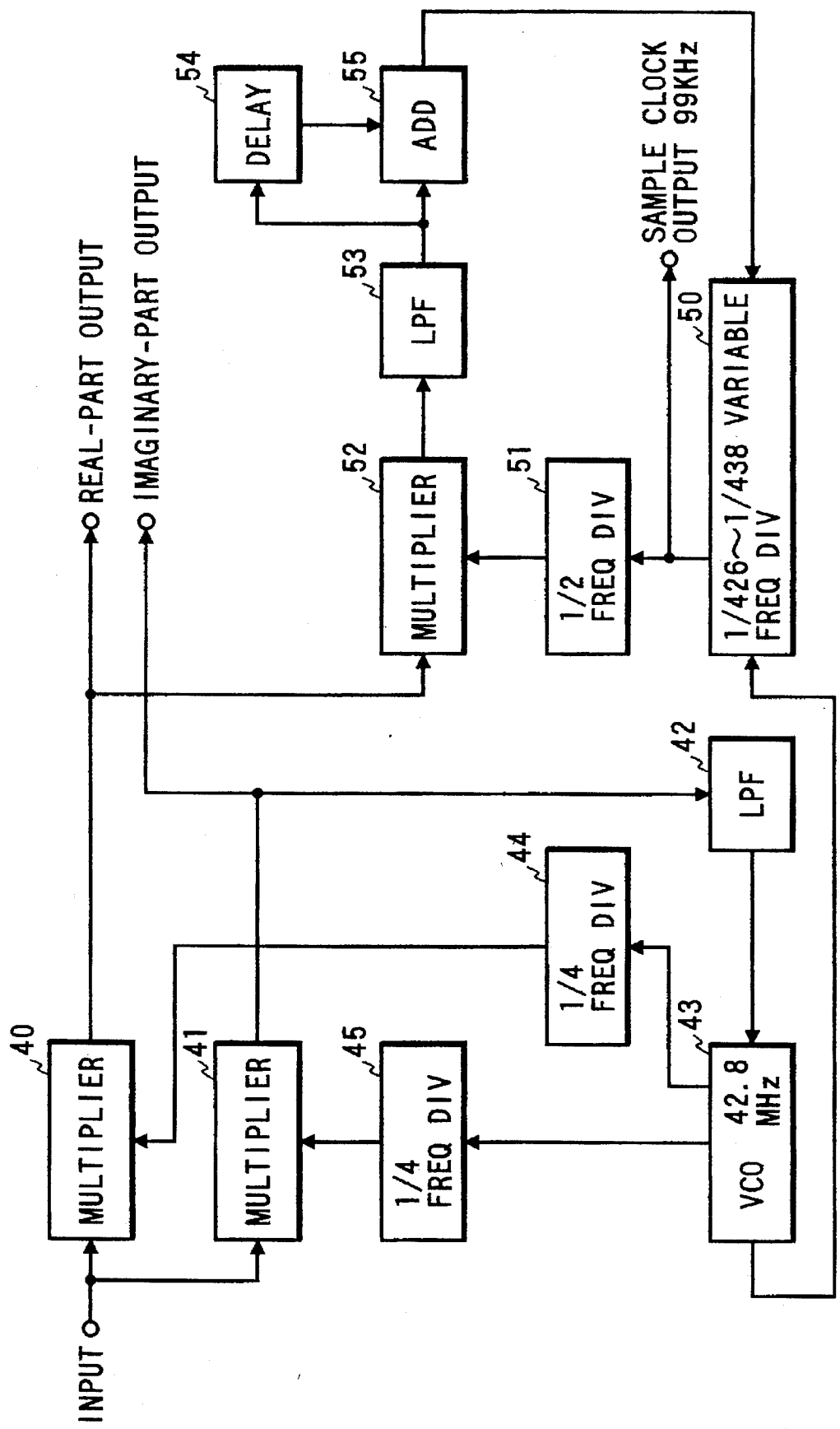
FIG. 6 is a block diagram of a portion of a signal receiving apparatus using orthogonal frequency division multiplexing (OFDM) according to a third embodiment of this invention.

FIG. 6 shows a portion of a signal receiving apparatus using orthogonal frequency division multiplexing (OFDM) according to a third embodiment of this invention. The signal receiving apparatus of FIG. 6 is similar to the signal receiving apparatus of FIG. 5 except for design changes indicated later.

The signal receiving apparatus of FIG. 6 includes the following circuits in place of the quadrature demodulator 23, the carrier detecting circuit 29, the 90° phase shifting circuit 30, the local oscillator 31, and the sample sync signal generating circuit 32 of FIG. 5.

With reference to FIG. 6, a multiplier 41, an LPF 42, a VCO circuit 43, and a ¼ frequency divider 45 compose a PLL circuit serving as a carrier extracting circuit. The VCO circuit 43 is designed to oscillate at and around a frequency (42.8 MHz) equal to four times the central intermediate-frequency (10.7 MHz). The VCO circuit 43 output quadrature oscillation signals to a ¼ frequency divider 44 and the ¼ frequency divider 45 respectively. The devices 44 and 45 divide the frequencies of the output signals of the VCO circuit 43 by four respectively. The output signal of the frequency divider 44 is fed to a multiplier 40. The output signal of the frequency divider 45 is fed to the multiplier 41.

The IF OFDM signal outputted from the IF amplifying circuit 22 (see FIG. 5) is applied to the multipliers 40 and 41. The multipliers 40 and 41 compose a quadrature demodulator. The multipliers 40 and 41 mix the IF OFDM signal with the output signals of the ¼ frequency dividers 44 and 45 so that the IF OFDM signal is demodulated into baseband signals corresponding to a real part and an imaginary part respectively.

The output signal of the multiplier 41 which corresponds to the imaginary part is fed via the LPF 42 to the VCO circuit 43 as a control signal. As previously described, the multiplier 41, the LPF 42, the VCO circuit 43, and the ¼ frequency divider 45 compose a PLL circuit which is locked with respect to the central carrier in the IF OFDM signal. The VCO circuit 43 outputs a signal with a fixed frequency (a locked frequency) equal to four times the central intermediate-frequency (10.7 MHz). The locked-frequency signal is fed from the VCO circuit 43 to a variable frequency divider 50.

A variable frequency divider 50 receives the locked-frequency signal from the VCO circuit 43. The device 50 divides the frequency of the output signal of the VCO circuit 43 by a value variable in the rage of ¹⁄₄₂₆ to ¹⁄₄₃₈. The output signal of the variable frequency divider 50 is fed to a ½ frequency divider 51. The ½ frequency divider 51 halves the frequency of the output signal of the variable frequency divider 50. The output signal of the ½ frequency divider 51 is applied to a multiplier 52. In addition, the output signal of the multiplier 40 which corresponds to the real part is applied to the multiplier 52.

The multiplier 52 serves as a phase comparator operating on the output signals of the multiplier 40 and the ½ frequency divider 51. The output signal of the multiplier 52 is fed via an LPF 53 to a delay circuit 54 and an adding circuit 55. The LPF 53 serves to pass only components of the output signal of the multiplier 52 which correspond to a phase error signal effective in frequency control. The circuit 54 delays the output signal of the LPF 53 by a given time. The circuit 54 outputs the delay-resultant signal to the adding circuit 55. The circuit 55 adds the output signal of the LPF 53, that is, the non-delayed signal, and the delayed signal fed from the circuit 54. The delay circuit 54 and the adding circuit 55 compose a filter which is designed to attenuate neighboring carrier components. The frequency response characteristics of the filter have a dip point at 387 Hz corresponding to a symbol frequency. The output signal of the adding circuit 55 is fed to the variable frequency divider 50 as a control signal. The variable frequency divider 50 serves as a VCO circuit.

The VCO circuit 50, the ½ frequency divider 51, the multiplier 52, the LPF 53, the delay circuit 54, and the adding circuit 55 compose a PLL circuit locked with respect to a continuous pilot signal in the output signal of the multiplier 40 in the quadrature demodulator. Thus, the VCO circuit 50 outputs a sample clock signal in response to the reproduced pilot signal (the recovered pilot signal). The sample clock signal has a frequency of 99 kHz.

FOURTH EMBODIMENT

A fourth embodiment of this invention relates to a modification of the signal transmitting apparatus of FIG. 3 and a modification of the signal receiving apparatus of FIG. 5 or FIG. 6.

The fourth embodiment executes IFFT having a period N equal to 512. In the fourth embodiment, a pilot signal frequency is set to a given high-order frequency having a preset relation with a sample position signal which is denoted by a simple ratio between integers.

In the case of IFFT having a period M, a pilot signal is located at a frequency position equal to a half of a Nyquist frequency corresponding to each of a period M/4 and a period 3M/4. In addition, carriers transmitted by OFDM use those correspond to first to M/4-th output signals from the IFFT, and those corresponding to 3M/4-th to Moth output signals from the IFFT. Thus, it is possible to generate signals equivalent to those generated in the case of M=2N.

Accordingly, a continuous pilot signal can be transmitted by using an effective symbol interval as well as a guard interval. The sample position signal can be generated by recovering the pilot signal and multiplying the frequency of the recovered pilot signal by 4.

In the fourth embodiment, the frequency of a sample clock signal for driving the FFT QAM decoding circuit 27 is equal to 198 kHz. Accordingly, in the fourth embodiment, the variable frequency divider 50 is designed to provide a frequency division factor variable in the rage of 1/213 to 1/219, and the frequency divider 51 is designed to provide a frequency division factor of ¼.

FIFTH EMBODIMENT

A fifth embodiment of this invention is similar to the first embodiment thereof except that the guard interval setting circuit 4 (see FIG. 3) is modified to provide the following processes.

Figure 7:
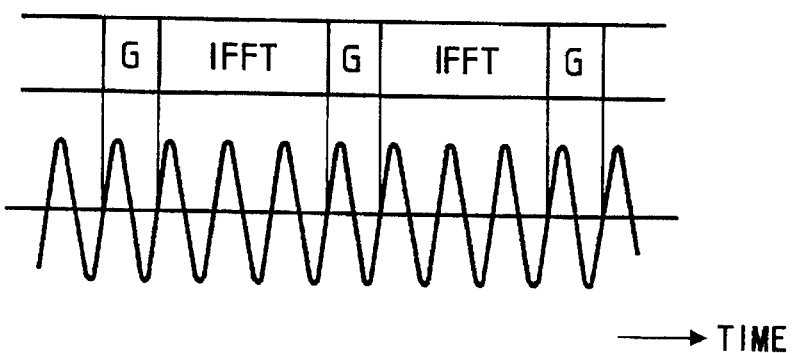
FIG. 7 is a time-domain diagram of guard intervals, IFFT intervals, and a pilot signal in a signal transmitting apparatus using orthogonal frequency division multiplexing (OFDM) according to a fifth embodiment of this invention.

The output signals of the IFFT and pilot signal generating circuit 3 (see FIG. 3) are fed to the guard interval setting circuit 4 including the RAM 4A (see FIG. 3). As shown in FIG. 7, the guard interval setting circuit 4 provides a guard interval "G" of a given length for every symbol of the output signals of the IFFT and prior signal generating circuit 3. Each transmission symbol interval is composed of a guard interval "G", and an effective symbol interval "IFFT" following the guard interval "G". The effective symbol interval "IFFT" is also referred to as the IFFT interval.

The guard interval setting circuit 4 operates in response to a clock signal fed from the clock signal generating circuit 10 (see FIG. 3). In the guard interval setting circuit 4, final portions of the output signals of the IFFT and pilot signal generating circuit 3 in every window interval (every symbol interval) are copied, and the copy-resultant signal portions are moved to temporal positions immediately preceding window interval signals (effective symbol interval signals).

To implement the above-indicated process, the guard interval setting circuit 4 functions as follows. Specifically, the output signals of the IFFT and pilot signal generating circuit 3 are stored, sequentially sample by sample, into the RAM 4A for every window interval (every symbol interval). Then, finally-stored portions of the output signals of the IFFT and pilot signal generating circuit 3 which correspond to one cycle or one wavelength are read out from the RAM 4A so that signals occupying a guard interval "G" are generated. Subsequently, the output signals of the IFFT and pilot signal generating circuit 3 are read out from the RAM 4A in a sequence starting from the firstly-stored portions thereof so that signals occupying an effective symbol interval "IFFT" following the previously-indicated guard interval "G" are generated.

As shown in FIG. 7, pilot signals (sync signals) are generated at equal phases for IFFT intervals respectively. To this end, a voltage signal applied to a given input terminal of the IFFT and pilot signal generating circuit 3 is held constant for IFFT intervals. The given input terminal corresponds to the pilot signal frequency (the sync signal frequency). Furthermore, the pilot signal (the sync signal) corresponding to one wavelength multiplied by a given integer is present in every IFFT interval while the pilot signal (the sync signal) corresponding to one wavelength is present in every guard interval "G". Accordingly, the pilot signal is continuously present over a plurality of successive transmission symbol intervals. Thus, an actually-transmitted pilot signal, that is, the pilot signal up-converted into a transmission RF range, has a monochromatic frequency spectrum (a single-line frequency spectrum).

It should be noted that the pilot signal (the sync signal) corresponding to one wavelength multiplied by a given integer may be present in every guard interval "G".

SIXTH EMBODIMENT

A sixth embodiment of this invention is similar to the first embodiment thereof except that an arrangement including the guard interval setting circuit 4 (see FIG. 3) is modified to provide the following processes.

Figure 8:
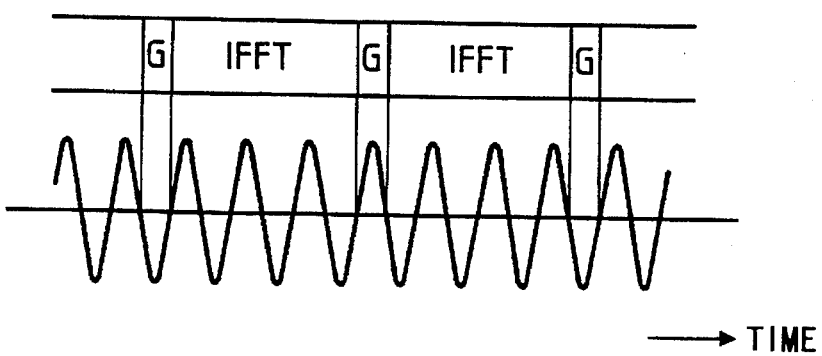
FIG. 8 is a time-domain diagram of guard intervals, IFFT intervals, and a pilot signal in a signal transmitting apparatus using orthogonal frequency division multiplexing (OFDM) according to a sixth embodiment of this invention.

The output signals of the IFFT and pilot signal generating circuit 3 (see FIG. 3) are fed to the guard interval setting circuit 4 including the RAM 4A (see FIG. 3). As shown in FIG. 8, the guard interval setting circuit 4 provides a guard interval "G" of a given length for every symbol of the output signals of the IFFT and pilot signal generating circuit 3. Each transmission symbol interval is composed of a guard interval "G", and an effective symbol interval "IFFT" following the guard interval "G". The effective symbol interval "IFFT" is also referred to as the IFFT interval.

The guard interval setting circuit 4 operates in response to a clock signal fed from the clock signal generating circuit 10 (see FIG. 3). In the guard interval setting circuit 4, final portions of the output signals of the IFFT and pilot signal generating circuit 3 in every window interval (every symbol interval) are copied, and the copy-resultant signal portions are moved to temporal positions immediately preceding window interval signals (effective symbol interval signals).

To implement the above-indicated process, the guard interval setting circuit 4 functions as follows. Specifically, the output signals of the IFFT and pilot signal generating circuit 3 are stored, sequentially sample by sample, into the RAM 4A for every window interval (every symbol interval). Then, finally-stored portions of the output signals of the IFFT and pilot signal generating circuit 3 which correspond to a half cycle or a half wavelength are read out from the RAM 4A so that signals occupying a guard interval "G" are generated. Subsequently, the output signals of the IFFT and pilot signal generating circuit 3 are read out from the RAM 4A in a sequence starting from the firstly-stored portions thereof so that signals occupying an effective symbol interval "IFFT" following the previously-indicated guard interval "G" are generated.

As shown in FIG. 8, pilot signals (sync signals) are generated alternately at opposite phases for IFFT intervals. To this end, a voltage signal applied to a given input terminal of the IFFT and pilot signal generating circuit 3 is alternately changed for IFFT intervals. The given input terminal corresponds to the pilot signal frequency (the sync signal frequency). Furthermore, the pilot signal (the sync signal) corresponding to one wavelength multiplied by a given integer is present in every IFFT interval while the pilot signal (the sync signal) corresponding to a half wavelength is present in every guard interval "G". Accordingly, the pilot signal is continuously present over a plurality of successive transmission symbol intervals. Thus, an actually-transmitted pilot signal, that is, the pilot signal up-converted into a transmission RF range, has a monochromatic frequency spectrum (a single-line frequency spectrum).

It should be noted that the pilot signal (the sync signal) corresponding to a half wavelength multiplied by a given odd integer may be present in every guard interval "G".

SEVENTH EMBODIMENT

A seventh embodiment of this invention is similar to the first embodiment thereof except that the guard interval setting circuit 4 (see FIG. 3) is modified to provide the following processes.

Figure 9:
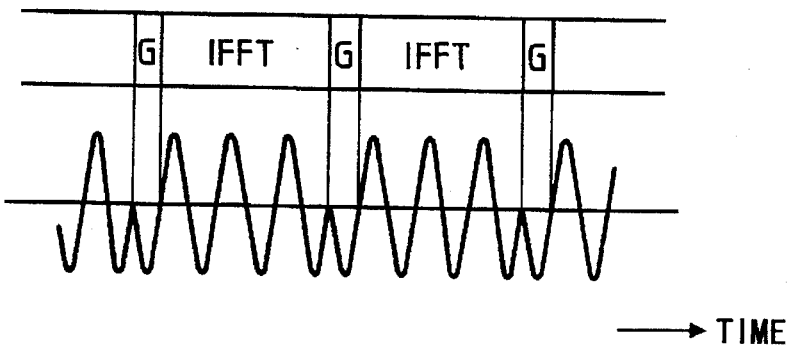
FIG. 9 is a time-domain diagram of guard intervals, IFFT intervals, and a pilot signal in a signal transmitting apparatus using orthogonal frequency division multiplexing (OFDM) according to a seventh embodiment of this invention.

The output signals of the IFFT and pilot signal generating circuit 3 (see FIG. 3) are fed to the guard interval setting circuit 4 including the RAM 4A (see FIG. 3). As shown in FIG. 9, the guard interval setting circuit 4 provides a guard interval "G" of a given length for every symbol of the output signals of the IFFT and pilot signal generating circuit 3. Each transmission symbol interval is composed of a guard interval "G", and an effective symbol interval "IFFT" following the guard interval "G", The effective symbol interval "IFFT" is also referred to as the IFFT interval.

The guard interval setting circuit 4 operates in response to a clock signal fed from the clock signal generating circuit 10 (see FIG. 3). In the guard interval setting circuit 4, final portions of the output signals of the IFFT and pilot signal generating circuit 3 in every window interval (every symbol interval) are copied, and the copy-resultant signal portions are moved to temporal positions immediately preceding window interval signals (effective symbol interval signals).

To implement the above-indicated process, the guard interval setting circuit 4 functions as follows. Specifically, the output signals of the IFFT and pilot signal generating circuit 3 are stored, sequentially sample by sample, into the RAM 4A for every window interval (every symbol interval). Then, finally-stored portions of the output signals of the IFFT and pilot signal generating circuit 3 which correspond to a half cycle or a half wavelength are read out from the RAM 4A so that signals occupying a guard interval "G" are generated. Subsequently, the output signals of the IFFT and pilot signal generating circuit 3 are read out from the RAM 4A in a sequence starting from the firstly-stored portions thereof so that signals occupying an effective symbol interval "IFFT" following the previously-indicated guard interval "G" are generated.

As shown in FIG. 9, pilot signals (sync signals) are generated at equal phases for IFFT intervals respectively. To this end, a voltage signal applied to a given input terminal of the IFFT and pilot signal generating circuit 3 is held constant for IFFT intervals. The given input terminal corresponds to the pilot signal frequency (the sync signal frequency). Furthermore, the pilot signal (the sync signal) corresponding to one wavelength multiplied by a given integer is present in every IFFT interval while the pilot signal (the sync signal) corresponding to a half wavelength is present in every guard interval "G". As shown in FIG. 9, the phase of the pilot signal (the sync signal) is inverted each time an IFFT interval is replaced by a guard interval "G".

It should be noted that the pilot signal (the sync signal) corresponding to a half wavelength multiplied by a given odd integer may be present in every guard interval "G".

EIGHTH EMBODIMENT

An eighth embodiment of this invention is similar to the first embodiment thereof except that an arrangement including the guard interval setting circuit 4 (see FIG. 3) is modified to provide the following processes.

Figure 10:
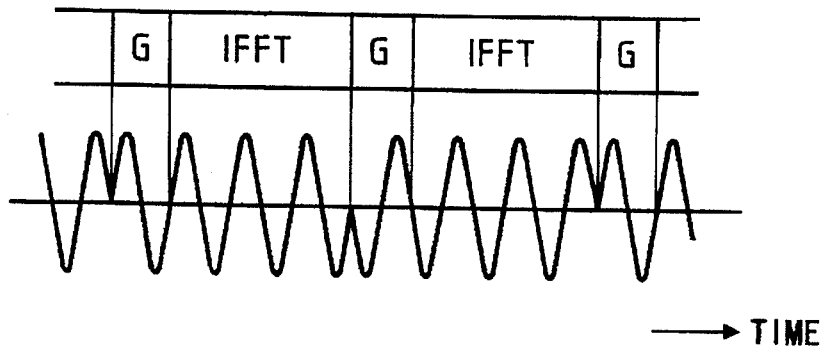
FIG. 10 is a time-domain diagram of guard intervals, IFFT intervals, and a pilot signal in a signal transmitting apparatus using orthogonal frequency division multiplexing (OFDM) according to an eighth embodiment of this invention.

The output signals of the IFFT and pilot signal generating circuit 3 (see FIG. 3) are fed to the guard interval setting circuit 4 including the RAM 4A (see FIG. 3). As shown in FIG. 10, the guard interval setting circuit 4 provides a guard interval "G" of a given length for every symbol of the output signals of the IFFT and pilot signal generating circuit 3. Each transmission symbol interval is composed of a guard interval "G", and an effective symbol interval "IFFT" following the guard interval "G". The effective symbol interval "IFFT" is also referred to as the IFFT interval.

The guard interval setting circuit 4 operates in response to a clock signal fed from the clock signal generating circuit 10 (see FIG. 3). In the guard interval setting circuit 4, final portions of the output signals of the IFFT and pilot signal generating circuit 3 in every window interval (every symbol interval) are copied, and the copy-resultant signal portions are moved to temporal positions immediately preceding window interval signals (effective symbol interval signals).

To implement the above-indicated process, the guard interval setting circuit 4 functions as follows. Specifically, the output signals of the IFFT and pilot signal generating circuit 3 are stored, sequentially sample by sample, into the RAM 4A for every window interval (every symbol interval). Then, finally-stored portions of the output signals of the IFFT and pilot signal generating circuit 3 which correspond ⋅to one cycle or one wavelength are read out from the RAM 4A so that signals occupying a guard interval "G" are generated. Subsequently, the output signals of the IFFT and pilot signal generating circuit 3 are read out from the RAM 4A in a sequence starting from the firstly-stored portions thereof so that signals occupying an effective symbol interval "IFFT" following the previously-indicated guard interval "G" are generated.

As shown in FIG. 10, pilot signals (sync signals) are generated alternately at opposite phases for IFFT intervals.

To this end, a voltage signal applied to a given input terminal of the IFFT and prior signal generating circuit 3 is alternately changed for IFFT intervals. The given input terminal corresponds to the pilot signal frequency (the sync signal frequency). Furthermore, the pilot signal (the sync signal) corresponding to one wavelength multiplied by a given integer is present in every IFFT interval while the pilot signal (the sync signal) corresponding to one wavelength is present in every guard interval "G". As shown in FIG. 10, the phase of the pilot signal (the sync signal) is inverted each time an IFFT interval is replaced by a guard interval "G".

It should be noted that the pilot signal (the sync signal) corresponding to a half wavelength multiplied by an even integer (different from two) may be present in every guard interval "G".

NINTH EMBODIMENT

A signal receiving apparatus according to a ninth embodiment of this invention is designed to accept an RF OFDM signal transmitted by a signal transmitting apparatus of the seventh embodiment or the eighth embodiment. The ninth embodiment is similar to the second embodiment except that the sample sync signal generating circuit 32 (see FIG. 5) and the symbol sync signal generating circuit 33 (see FIG. 5) are modified to include an arrangement of FIG. 11.

Figure 11:
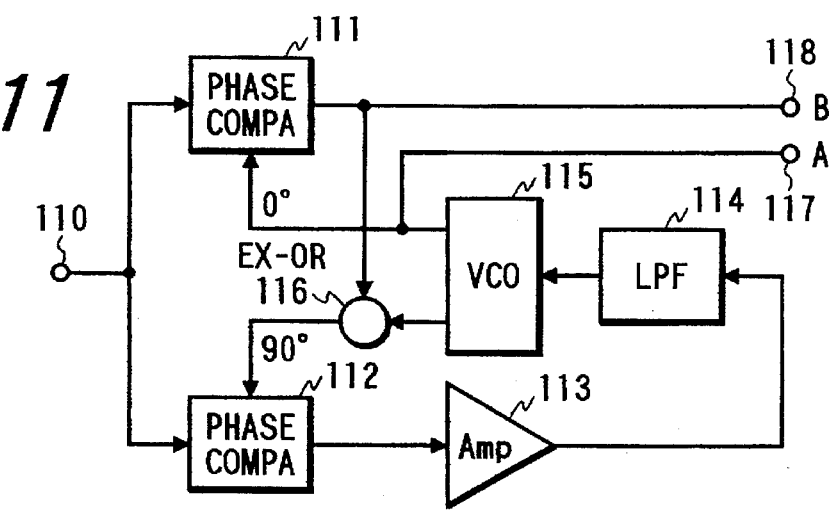
FIG. 11 is a block diagram of a sync-signal detecting arrangement in a signal receiving apparatus using orthogonal frequency division multiplexing (OFDM) according to a ninth embodiment of this invention.

The arrangement of FIG. 11 includes phase comparators 111 and 112, an amplifier 113, an LPF (a low pass filter or a loop filter) 114, a VCO circuit 115, and an Exclusive-OR circuit 116. First input terminals of the phase comparators 111 and 112 are connected to the quadrature demodulator 23 (see FIG. 5) via an input terminal 110. A second input terminal of the phase comparator 111 is connected to a first output terminal of the VCO circuit 115. The output terminal of the phase comparator 111 leads to a first input terminal of the Exclusive-OR circuit 116. A second output terminal of the VCO circuit 115 leads to a second input terminal of the Exclusive-OR circuit 116. Signals which appear at the first and second output terminals of the VCO circuit 115 have a quadrature relation with each other. The output terminal of the Exclusive-OR circuit 116 leads to a second input terminal of the phase comparator 112. The output terminal of the phase comparator 112 is connected to a control terminal of the VCO circuit 115 via the amplifier 113 and the LPF 114.

The phase comparator 112, the amplifier 113, the LPF 114, and the VCO circuit 115 compose a PLL circuit in which the Exclusive-OR circuit 116 is interposed. The PLL circuit is phase-locked with respect to a pilot signal in an output signal of the quadrature demodulator 23 (see FIG. 5).

Figure 12:
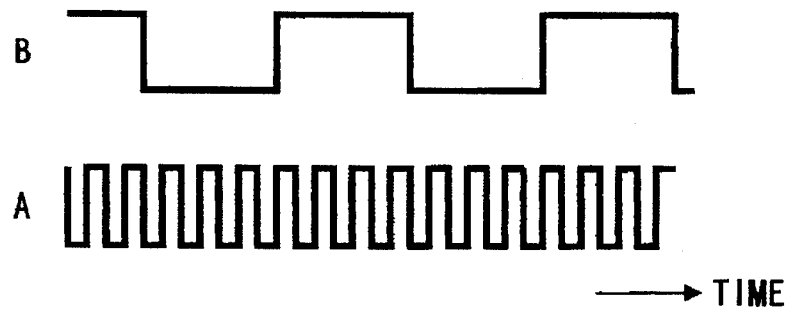
FIG. 12 is a time-domain diagram of signals in the sync-signal detecting arrangement of FIG. 11.

The phase comparator 111 executes synchronous detection between the output signal of the quadrature demodulator 23 (see FIG. 5) and a first output signal of the VCO circuit 115, thereby reproducing and outputting a symbol sync signal (a symbol interval signal or a symbol clock signal) which has a waveform such as shown in the portion B of FIG. 12. The symbol sync signal is transmitted from the arrangement of FIG. 11 via an output terminal 118.

The Exclusive-OR circuit 116 executes Exclusive-OR operation between the output signal of the phase comparator 111 and a second output signal of the VCO circuit 115 which has a quadrature relation with the first output signal of the VCO circuit 115. The output signal of the Exclusive-OR circuit 116 is applied to the phase comparator 112. The Exclusive-OR circuit 116 serves to invert the phase of the second output signal of the VCO circuit 115 for every other symbol interval. As a result, the PLL circuit is continuously phase-locked with respect to the pilot signal in the output signal of the quadrature demodulator 23 (see FIG. 5). The first output signal of the VCO circuit 115 constitutes a reproduced pilot signal which has a waveform such as shown in the portion A of FIG. 12. The reproduced pilot signal is transmitted from the arrangement of FIG. 11 via an output terminal 117. A frequency converter or a frequency multiplier (not shown) following the arrangement of FIG. 11 changes the frequency of the reproduced pilot signal by a given factor, thereby converting the reproduced pilot signal into a sample clock signal.

TENTH EMBODIMENT

A signal receiving apparatus according to a tenth embodiment of this invention is designed to accept an RF OFDM signal transmitted by a signal transmitting apparatus of the seventh embodiment or the eighth embodiment. The tenth embodiment is similar to the second embodiment except that the sample sync signal generating circuit 32 (see FIG. 5) and the symbol sync signal generating circuit 33 (see FIG. 5) are modified to include an arrangement of FIG. 13.

Figure 13:
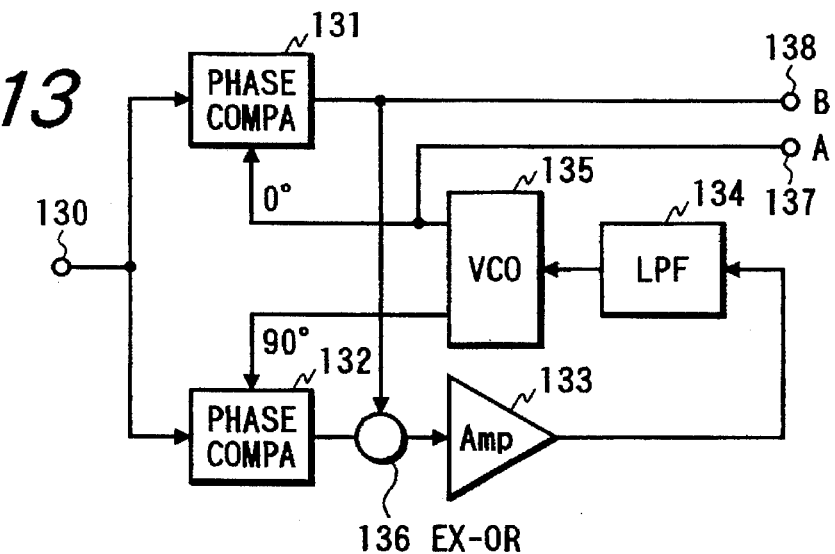
FIG. 13 is a block diagram of a sync-signal detecting arrangement in a signal receiving apparatus using orthogonal frequency division multiplexing (OFDM) according to a tenth embodiment of this invention.

The arrangement of FIG. 13 includes phase comparators 131 and 132, an amplifier 133, an LPF (a low pass filter or a loop filter) 134, a VCO circuit 135, and an Exclusive-OR circuit 136. First input terminals of the phase comparators 131 and 132 are connected to the quadrature demodulator 23 (see FIG. 5) via an input terminal 130. A second input terminal of the phase comparator 131 is connected to a first output terminal of the VCO circuit 135. The output terminal of the phase comparator 131 leads to a first input terminal of the Exclusive-OR circuit 136. A second output terminal of the VCO circuit 135 leads to a second input of the phase comparator 132. Signals which appear at the first and second output terminals of the VCO circuit 135 have a quadrature relation with each other. The output terminal of the phase comparator 132 leads to a second input terminal of the Exclusive-OR circuit 136. The output terminal of the Exclusive-OR circuit 136 is connected to a control terminal of the VCO circuit 135 via the amplifier 133 and the LPF 134.

The phase comparator 132, the amplifier 133, the LPF 134, and the VCO circuit 135 compose a PLL circuit in which the Exclusive-OR circuit 136 is interposed. The PLL circuit is phase-locked with respect to a pilot signal in an output signal of the quadrature demodulator 23 (see FIG. 5).

The phase comparator 131 executes synchronous detection between the output signal of the quadrature demodulator 23 (see FIG. 5) and a first output signal of the VCO circuit 135, thereby reproducing and outputting a symbol sync signal (a symbol interval signal or a symbol clock signal) which has a waveform such as shown in the portion B of FIG. 12. The symbol sync signal is transmitted from the arrangement of FIG. 13 via an output terminal 138.

The phase comparator 132 receives a second output signal of the VCO circuit 135 which has a quadrature relation with the first output signal thereof. The device 132 executes phase comparison between the output signal of the quadrature demodulator 23 (see FIG. 5) and the second output signal of the VCO circuit 135. The Exclusive-OR circuit 136 executes Exclusive-OR operation between the output signal of the phase comparator 131 and the output signal of the phase comparator 132. The output signal of the Exclusive-OR circuit 116 is transmitted to the VCO circuit 135 via the amplifier 133 and the LPF 134. The Exclusive-OR circuit 136 serves to invert the phase of the output signal of the phase comparator 132 for every other symbol interval. As a result, the PLL circuit is continuously phase-locked with respect to the pilot signal in the output signal of the quadrature demodulator 23 (see FIG. 5). The first output signal of the VCO circuit 135 constitutes a reproduced pilot signal which has a waveform such as shown in the portion A of FIG. 12. The reproduced pilot signal is transmitted from the arrangement of FIG. 13 via an output terminal 137. A frequency converter or a frequency multiplier (not shown) following the arrangement of FIG. 13 changes the frequency of the reproduced pilot signal by a given factor, thereby converting the reproduced pilot signal into a sample clock signal.

What is claimed is:

1. A signal transmitting apparatus using orthogonal frequency division multiplexing, comprising:

an inverse fast Fourier transform circuit for converting a digital information signal into a first multi-value QAM modulation signal;

a guard interval setting circuit for periodically generating a guard interval signal equal to a time segment of the first multi-value QAM modulation signal, and inserting the guard interval signal into the first multi-value QAM modulation signal to convert the first multi-value QAM modulation signal into a second multi-value QAM modulation signal; and a clock signal generating circuit for generating a first clock signal which drives the inverse fast Fourier transform circuit, and generating a second clock signal which drives the guard interval setting circuit;

wherein the inverse fast Fourier transform circuit comprises means for generating a pilot signal which corresponds to a given-order carrier, and adding the pilot signal to the first multi-value QAM modulation signal, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by the guard interval signal in the second multi-value QAM modulation signal, and wherein the pilot signal is continuously present over the guard interval and another interval.

2. The signal transmitting apparatus of claim 1, wherein the first dock signal and the second clock signal are the same.

3. The signal transmitting apparatus of claim 1, wherein a ratio between the frequency of the pilot signal and a frequency of the first clock signal is equal to a ratio between predetermined integers.

4. A signal transmitting apparatus using orthogonal frequency division multiplexing, comprising:

an inverse fast Fourier transform circuit for converting a digital information signal into a first multi-value QAM modulation signal;

a guard interval setting circuit for periodically generating a guard interval signal equal to a time segment of the first multi-value QAM modulation signal, and inserting the guard interval signal into the first multi-value QAM modulation signal to convert the first multi-value QAM modulation signal into a second multi-value QAM modulation signal; and a clock signal generating circuit for generating a first clock signal which drives the inverse fast Fourier transform circuit, and generating a second clock signal which drives the guard interval setting circuit;

wherein the inverse fast Fourier transform circuit comprises means for generating a pilot signal which corresponds to a given-order carrier, and adding the pilot signal to the first multi-value QAM modulation signal, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by the guard interval signal in the second multi-value QAM modulation signal, and wherein time segments of the pilot signal in two adjacent symbol periods have an inverted relation with each other.

5. The signal transmitting apparatus of claim 4, wherein the first clock signal and the second clock signal are the same.

6. The signal transmitting apparatus of claim 4, wherein a ratio between the frequency of the pilot signal and a frequency of the first clock signal is equal to a ratio between predetermined integers.

7. A signal receiving apparatus using orthogonal frequency division multiplexing, comprising:

first means for reproducing a pilot signal from a multi-value QAM modulation signal by angle demodulation, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by a guard interval signal in the multi-value QAM modulation signal, and wherein the pilot signal is continuously present over the guard interval and another interval;

second means for converting a frequency of the reproduced pilot signal to change the reproduced pilot signal into a clock signal; and a fast Fourier transform circuit for converting the multi-value QAM modulation signal into a digital information signal;

wherein the fast Fourier transform circuit is driven by the clock signal generated by the second means.

8. A signal receiving apparatus using orthogonal frequency division multiplexing, comprising:

first means for reproducing a pilot signal from a multi-value QAM modulation signal by angle demodulation, wherein the pilot signal has a predetermined frequency and an angle modulation component which remains constant over a plurality of symbol periods, wherein the pilot signal corresponding to a given integer times its wavelength or a given odd number times its half wavelength is present in a guard interval occupied by a guard interval signal in the multi-value QAM modulation signal, and wherein time segments of the pilot signal in two adjacent symbol periods have an inverted relation with each other; second means for converting a frequency of the reproduced pilot signal to change the reproduced pilot signal into a clock signal; and a fast Fourier transform circuit for converting the multi-value QAM modulation signal into a digital information signal;

wherein the fast Fourier transform circuit is driven by the clock signal generated by the second means.

* * * * *